United States Patent [19]
Mercer

[11] Patent Number: 6,005,332
[45] Date of Patent: Dec. 21, 1999

[54] POLARIZED LIGHT PRODUCING LAMP APPARATUS THAT USES LOW TEMPERATURE POLARIZING FILM

[75] Inventor: William Burton Mercer, Spring, Tex.

[73] Assignee: Fusion Lighting, Inc., Rockville, Md.

[21] Appl. No.: 08/771,326

[22] Filed: Dec. 20, 1996

[51] Int. Cl.$^6$ ........................................ H01J 5/16
[52] U.S. Cl. .................... 313/113; 313/231.31; 313/573; 313/580; 313/594; 313/607
[58] Field of Search ..................... 313/113, 112, 313/161, 231.31, 570, 571, 573, 580, 594, 607, 231.61; 315/248; 345/41; 362/216

[56] References Cited

U.S. PATENT DOCUMENTS

| | | |
|---|---|---|
| 34,492 | 12/1862 | Roberts . |
| 4,792,732 | 12/1988 | O'Loughlin ............................. 315/334 |
| 4,799,137 | 1/1989 | Aho ........................................ 362/309 |
| 4,874,228 | 10/1989 | Aho et al. ............................... 350/345 |
| 5,054,885 | 10/1991 | Melby ..................................... 359/618 |

(List continued on next page.)

FOREIGN PATENT DOCUMENTS

| | | |
|---|---|---|
| 0 657 769 A1 | 5/1994 | European Pat. Off. . |
| 42 09 453 A 1 | 9/1993 | Germany . |
| PCT 92/08240 | 5/1992 | WIPO . |
| PCT 97/27606 | 7/1997 | WIPO . |

OTHER PUBLICATIONS

Austrian Patent Office Service and Information Section Search Report and Written Opinion, Nov. 5, 1997, 6 pgs.
"Chapter 8—Liquid Crystal Displays," pp. 181–251.
"Optics for Image Disposition Systems".

(List continued on next page.)

Primary Examiner—Nimeshkumar D. Patel
Assistant Examiner—Michael J. Smith

[57] ABSTRACT

A high efficiency lamp apparatus for producing a light beam of polarized light includes an electrodeless lamp body that defines a chamber. A gas is contained within the chamber such as sulfur or selenium or a compound thereof that can be excited to form a plasma. Electrodes are positioned externally of the lamp chamber for producing radio frequency energy that excites the gas, forming a plasma light source of intense heat that emits a light beam. Electrodes are not subjected to the intense heat generated by the plasma as they are placed externally of the lamp body. A reflector is positioned next to the lamp body for redirecting some of the light emitted by the light source back to the lamp using the reflector so that the lamp reabsorbs light energy to intensify the light source. The reflector includes a polarizing filter that is positioned to receive and polarize the light beam. An insulator prevents heat intensity of the plasma from damaging the polarizing filter as it has a low operating temperature range.

38 Claims, 2 Drawing Sheets

U.S. PATENT DOCUMENTS

| | | | |
|---|---|---|---|
| 5,083,857 | 1/1992 | Hornbeck | 359/291 |
| 5,122,905 | 6/1992 | Wheatley et al. | 359/586 |
| 5,122,906 | 6/1992 | Wheatley | 359/586 |
| 5,148,157 | 9/1992 | Florence | 340/783 |
| 5,190,370 | 3/1993 | Miller et al. | 362/340 |
| 5,225,823 | 7/1993 | Kanaly | 340/793 |
| 5,233,385 | 8/1993 | Sampsell | 355/35 |
| 5,270,608 | 12/1993 | Williamson et al. | 313/25 |
| 5,313,479 | 5/1994 | Florence | 372/26 |
| 5,381,309 | 1/1995 | Borchardt | 362/31 |
| 5,404,076 | 4/1995 | Dolan | 313/572 |
| 5,404,171 | 4/1995 | Golstein et al. | 348/459 |
| 5,416,618 | 5/1995 | Juday | 359/53 |
| 5,453,859 | 9/1995 | Sannohe et al. | 359/63 |
| 5,467,146 | 11/1995 | Huang et al. | 348/743 |
| 5,467,154 | 11/1995 | Gale et al. | 353/77 |
| 5,471,584 | 11/1995 | Blaxtan et al. | 359/263 |
| 5,479,328 | 12/1995 | Lee et al. | 362/216 |
| 5,486,949 | 1/1996 | Schrenk et al. | 359/498 |
| 5,504,391 | 4/1996 | Turner et al. | 313/570 |
| 5,508,841 | 4/1996 | Lin et al. | 359/318 |
| 5,523,881 | 6/1996 | Florence et al. | 359/561 |
| 5,555,324 | 9/1996 | Waxman et al. | 382/254 |
| 5,573,324 | 11/1996 | De Vaan | 353/77 |
| 5,606,220 | 2/1997 | Dolan et al. | 313/637 |
| 5,610,469 | 3/1997 | Bergman et al. | 313/25 |
| 5,612,820 | 3/1997 | Schrenk et al. | 359/498 |
| 5,626,800 | 5/1997 | Williams et al. | 264/1.38 |
| 5,642,129 | 6/1997 | Zavracky et al. | 345/100 |
| 5,670,842 | 9/1997 | Dolan et al. | 313/570 |
| 5,675,677 | 10/1997 | Davenport et al. | |
| 5,682,080 | 10/1997 | Dolan et al. | 313/570 |
| 5,686,793 | 11/1997 | Turner et al. | 313/570 |
| 5,688,064 | 11/1997 | Shanks | |
| 5,692,820 | 12/1997 | Gale et al. | 353/119 |
| 5,747,917 | 5/1998 | Herchen | 313/231.31 |
| 5,833,360 | 11/1998 | Knox et al. | 362/293 |

OTHER PUBLICATIONS

Baur, T. et al., "High Performance Liquid Crystal Device Suitable for Projection Display," SPIE vo. 2650, pp. 226–228 (Jul. 1996).

Displaytech, Inc., "FLC/VLSI Display Technology" (Dec. 1, 1995).

Gambogi, W., et al., "HOE Imaging in DuPont Holographic Photopolymers," Proc. SPIE, "Diffractive and Holographic Optics Technology," vol. 2152 (1994).

Gambogi, W.J. et al., "Advances and Applications of DuPont Holographic Photopolymers," Optics Quebec '93, Conf. 2043, "Holographic Imaging and Materials" (Aug. 1993).

Gambogi, W.J. et al., "Color Holography Using DuPont Holographic Recording Films," Proc. SPIE, "Holographic Materials," vol. 2405 (Feb. 1995).

Gambogi, W.J. et al., "Diffractive Printing Methods Using Volume Holograms," IS&T/SPIE 1993 Int'l Conf. on Electronic Imaging, conf. 1914 (1993).

Gambogi, W.J. et al., "Holographic Transmission Elements Using Improved Photopolymer Films," SPIE vol. 1555 Computer and Optically Generated Holographic Optics (Fourth in a Series), pp. 256–266 (1991).

Handbook of Optics, vol II, Devices, Measurements, and Properties, "Chapter 3—Polarizers".

Jack M. Younse, "Projection Display Systems Based on the Digital Micromirror Device (DMD)," SPIE Proceedings Reprint, vol. 2641, pp. 64–75 (Jul. 1995).

Joubert, C. et al., "Dispersive Holographic Microlens Matrix for Single LCD Projection."

Larry J. Hornbeck, "Digital Light Processing and MEMS: Timely Convergence for a Bright Future," presented at Micromachining and Microfabrication '95 (Oct. 23–24, 1995).

Parfenov, A.V. and Putilin, A.N., "Advanced Optical Schemes with Liquid Crystal Image Converters for Display Applications," SPIE vol. 2650, pp. 173–179 (Jul. 1996).

Tipton, D. et al., "Improved Process of Reflection Holography Replication and Heat Processing," Proc. SPIE, "Practical Holography VIII, Materials and Processing," vol. 2176 (Feb. 1994).

Weber, A.M. et al., "Hologram Recording in DuPont's New Photopolymer Materials," Practical Holography IV, SPIE OE/Lase Conference Proceedings, 1212–04 (Jan. 1990).

Website: Applications of PDLCs http://abalone.cwru.edu/tutorial/enhanced/files/pdlc/apps/apps.html.

Website: New Flat Panel Display Technologies http://mambo.ucsc.edu/psl/cis_seminars/119610/19961017.html.

Website: Polymer Dispersed Liquid Crystals http://www-.bell–labs.com/new/gallery/pdlc.html.

Website: Polymer–dispersed LCDs http://stefan.www.media.mit.edu/people/st . . . ls/node9.htm (May 18,1995).

Website: Worldwide Flat Panel Display Markets and Trends http://www.electronictrendpubs.com/fpd.htm (Mar. 1996).

POLARIZED LIGHT PRODUCING LAMP APPARATUS THAT USES LOW TEMPERATURE POLARIZING FILM

BACKGROUND OF THE INVENTION

1. Field of the Invention

The present invention relates to high temperature lamp apparatus with high efficiency that produces a beam of polarized light using a lamp bulb containing a fill under pressure that is energized with externally placed electrodes for vaporizing the gas. More particularly, the present invention relates to high power, high temperature electrodeless lamp in which light energy is polarized with a low temperature reflecting polarizer material and an insulator is positioned in between the vaporized gas and polarizing film material to prevent heat damage to the film.

2. Description of the Related Art

High power lamps are used for illumination applications beyond typical incandescent and fluorescent lamps. One type of lamp known as a high intensity discharge (HID) lamp consists of a glass envelope which contains electrodes and a fill which vaporizes and becomes a gas when the lamp is operated.

Recently, a patent issued for a high power lamp that utilizes a lamp fill containing sulfur or selenium or compounds of these substances. U.S. Pat. No. 5,404,076, issued to Dolan, et al., and entitled "Lamp Including Sulfur" discloses an electrodeless lamp utilizing an excited fill. The Dolan, et al., U.S. Pat. No. 5,404,076 is incorporated herein by reference.

Projecting systems are used to display images on large surfaces, such as movie or television screens and computer displays. For example, in a front projection system, an image beam is projected from an image source onto the front side of a reflection-type angle transforming screen, which then reflects the light toward a viewer positioned in front of the screen. In a rear projection system, the image beam is projected onto the rear side of a transmission-type angle transforming screen and transmitted toward a viewer located in front of the screen.

In prior co-pending U.S. patent application Ser. No. 08/581,108, entitled "Projecting Images," to Knox, filed Dec. 29, 1995, there is disclosed a method of displaying an optical image by projecting the image along an optical path and at an optical device interposed across the optical path, at one time reflecting the image from the optical device and at a different time permitting the image to pass through the optical device to be displayed. U.S. patent application Ser. No. 08/581,108, filed Dec. 29, 1995, is incorporated herein by reference. A projection system for such a display is disclosed in U.S. application Ser. No. 08/730,818, entitled "Image Projection System Engine Assembly," to Knox, filed Oct. 17, 1996, which is hereby incorporated by reference.

The image source for a projection system employs a light that must be of high intensity and preferably very efficient. Such a light is disclosed in U.S. patent application Ser. No. 08/747,190, entitled "High Efficiency Lamp Apparatus for Producing a Beam of Polarized Light," to Knox, et al., filed Nov. 12, 1995, which is hereby incorporated by reference. If an optical image is to be displayed by projection, it sometimes passes through an optical device interposed across the optical path. In the projection system of prior co-pending application Ser. No. 08/581,108, filed Dec. 29, 1995, one or more optical devices reflect the image at one time from the optical device and at a different time permit the image to pass through the optical device to be displayed. There will be a decrease in light intensity once the optical image strikes the optical device interposed across the optical path. Therefore, in projection systems where an optical device is interposed across the optical path there is a need for a projection engine with a high intensity light of improved efficiency.

One type of linear reflecting polarizer that is discussed in the above-referenced copending application is a reflecting polarizing film material is "DBEF" film material that can be obtained from Minnesota Mining & Manufacturing Company. DBEF (double brightness enhancement film) material is useful as an optical device for projecting video systems because it reflects substantially all light that does not pass through it. For example, it transmits substantially all light waves polarized to ninety degrees (i.e., "vertically" polarized light) and reflects substantially all light waves polarized to zero degrees (i.e., "horizontally" polarized light).

One of the problems of using a high intensity lamps (e.g., Dolan U.S. Pat. No. 5,404,076) with film type polarizers (e.g., 3M DBEF) is that of heat damage. Such lamps can generate heat of thousands of degrees (e.g., 3000° F.) while the reflecting polarizer film material can have a low temperature operating range of below 80° C. or as is typical for plastic (acrylics).

SUMMARY OF THE INVENTION

The present invention provides an improved high efficiency lamp apparatus for producing a light beam of polarized light that includes a lamp body having a chamber. A gas contained within the chamber is preferably of a sulfur, selenium or compounds of the substances to form a fill. This fill can be excited using electrodes positioned externally of the lamp chamber.

The electrodes produce radio frequency (or other suitable wavelength) energy that excites the gas, forming a plasma light source of intense heat the emits a light beam. The electrodes are thus not subjected to the intense heat generated by the plasma.

A reflector is positioned next to the lamp body for redirecting some of the light emitted by the light source back to the lamp using the reflector so that the lamp re-absorbs light energy to intensify the light source. The reflector includes a polarizing filter that is positioned to receive and polarize the light beam. The reflector is preferably a film layer, such as a brightness enhancement polarizer film. An insulator is provided that prevents heat intensity of the plasma from damaging the reflector.

In one embodiment, the insulator is a layer of material that is positioned in between the plasma light source and the reflector. The layer of material can be an optically clear glass, quartz, or sapphire material.

In another embodiment, the insulator is an enlarged gas retaining space within the lamp body that is positioned in between the plasma light source and the polarizing filter.

In another embodiment, the reflector is positioned at one end of the lamp body and the insulator is positioned within the lamp body but in between the bulb and the reflector.

In another embodiment, the insulator is in the form of an air gap that is positioned externally of the lamp body, forming an air insulation space in between the lamp body and the polarizing film layer.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
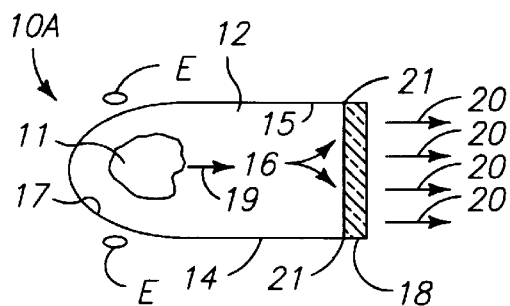
FIG. 1 is a longitudinal sectional elevational view of the first embodiment of the apparatus of the present invention.

FIG. 1 shows generally the preferred embodiment of the apparatus of the present invention designated generally by the numeral 10A. High efficiency lamp apparatus 10A includes a housing 14 having hollow interior 12 that contains a fill such as sulfur or selenium or compounds thereof. Electrodes are positioned externally of the housing 14 for producing radio frequency energy to excite the fill (preferably 150 MHz to 10 GHz or other frequency suitable for exciting the fill) to form a plasma 11. Electrodes E are positioned externally of housing 14 so that they are not subjected to the intense heat of the plasma 11 formed at the interior 12.

Although the electrodes E are shown positioned externally to the housing, it will be understood that a variety of other lamps could also benefit from the disclosed concepts according to the invention. The electrodes may be placed within the housing if appropriately insulated from the plasma, or if the lamp is of a type that can reabsorb and reemit light without damaging internal electrodes. In general, the concepts according to the invention find application in any system that can reabsorb and reemit light from a plasma which is generated at high temperatures.

A transversely positioned screen 18 is interposed across the path of a light beam 19 that is travelling from the plasma 11 through the end portion 16 in the direction of arrows 20. Screen 18 is sealed at its periphery 21 to wall 15 of housing 14 at end 16. Housing 14 has a reflective surface 17 on wall 15 that can be parabolic in longitudinal section as shown to redirect light back to plasma 11. Wall 15 and reflective surface 17 can also be polyellipsoid, elliptical, or other conical shapes known in the art. If the reflector is a diffuse reflector, the shape is not critical.

The screen 18 is preferably a linear reflecting polarizer screen that only allows a certain polarity of light to pass through as indicated by the arrows 20. Therefore, in lamp 10A, emitted light indicated as 20 has been filtered to be of a desired polarity.

The linear reflecting polarizer screen 18 can be a 90° linear polarizer that functions like a conventional absorption polarizer, except that it reflects (instead of absorbs) substantially all light that does not pass though it. In other words, the 90° reflecting polarizer screen 18 transmits substantially all light waves polarized to 90° (i.e., "vertically" polarized light) and reflects substantially all light waves polarized to 0° (i.e., "horizontally" polarized light). Polarizer 18 may be made of any suitable reflecting polarizing material, such as double brightness enhancement film ("DBEF") material obtained from Minnesota Mining and Manufacturing Company, where the "DBEF" is mounted on a clear supporting surface such as a glass plate.

Some reflecting polarizer screens such as "DBEF" material have a relatively low operating temperature range. The plasma 11 generated within the interior 12 of housing 14 could cause heat damage to screen 18. In the embodiment of FIG. 1, an extended interior space 12 is provided, spacing plasma 11 from screen 18. The plasma 11 is formed and sustained only near electrodes E, so that the high temperature plasma does not impinge on the screen 18, thus resulting in a lowered temperature at screen 18.

Figure 2:
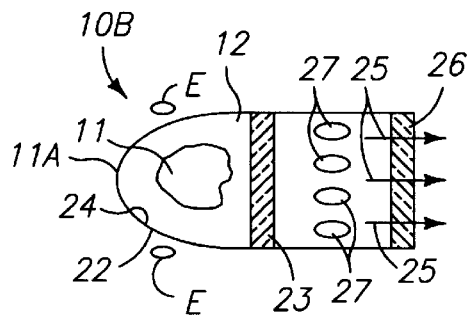
FIG. 2 is a longitudinal sectional elevational view of a second embodiment of the apparatus of the present invention.

In FIG. 2, a second embodiment is shown, designated generally as 10B. The light apparatus 10B has a bulb 11A with an interior space 12 for containing a fill such as sulfur or selenium or a compound thereof. Electrodes E can excite the fill within space 12 to form a plasma light source. A reflector housing 22 has an optically clear plate 23 (e.g., quartz, sapphire, glass) and an interior reflecting surface 24 that can be parabolic in longitudinal section as shown for example (or elliptical, polyellipsoidal or other conical shapes known in the art). Surface 24 reflects light emitted by the plasma 11 toward plate 23 and in the direction of the arrows 25.

In the embodiment of FIG. 2, screen 26 is positioned externally of plate 23 with an air gap therebetween created by air flow openings 27 in the wall of housing 22. Screen 26 is a reflecting polarizer, such as "DBEF" mounted on a plate, that only passes light indicated by arrows 25 of a desired polarity. The air gap in between plate 23 and screen 26 functions as an insulator to prevent heat damage to low temperature screen 26.

Figure 3:
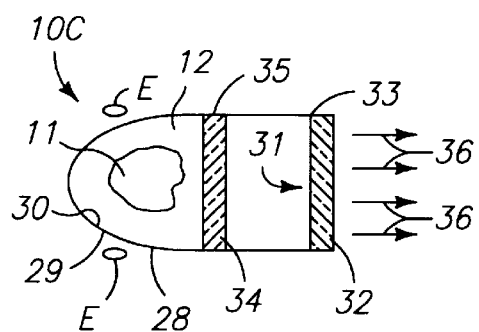
FIG. 3 is a longitudinal sectional elevational view of a third embodiment of the apparatus of the present invention.

FIG. 3 shows a third embodiment of the apparatus of the present invention designated as 10C. Light apparatus 10C includes lamp housing 28 having wall 29 that can be of a parabolic shape in longitudinal cross-section as shown in FIG. 3 (or elliptical, polyellipsoidal or other conical shape known in the art). Wall 29 has inner reflective surface 30. Housing 28 has open end 31 that is covered by reflecting polarizer 32. Electrodes E can be used to excite the gas within housing 28. As with the embodiments of FIGS. 1 and 2, a gas such as sulfur or selenium fills the interior 12 of housing 28 that is on the opposite side of insulator 34 from screen 32 and near electrodes E.

Reflecting polarizer screen 32 is preferably of "DBEF" material mounted on a plate. The screen 32 is joined at its periphery 33 to wall 29 of lamp housing 28. Light passing through screen 32 is polarized light designated as arrows 36.

Insulator screen 34 is positioned in between plasma 11 and screen 32. The insulator 34 is preferably an insulating material such as quartz or clear glass that is joined at 35 to reflective surface 30 of housing wall 29. Insulator screen 34 could also, however, be a selective infrared mirror which transmits visible light but reflects infrared light. The insulator screen 34 retains the plasma 11 and thus the heat transferred to the screen 32 is minimized.

Figure 4:
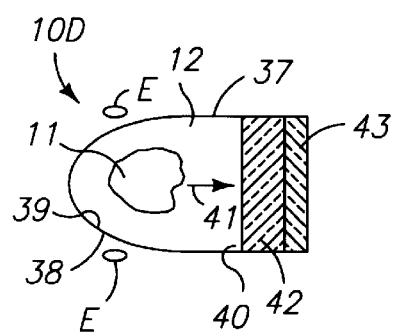
FIG. 4 is a longitudinal sectional elevational view of a fourth embodiment of the apparatus of the present invention.

FIG. 4 shows a fourth embodiment of the apparatus of the present invention designated generally by the numeral 10D. In 10D, the housing 37 has an interior 12 for containing gas to produce a plasma 11 when excited by electrodes E. Plasma 11 is surrounded by a reflector housing 37 having a wall 38. The wall 38 can be of parabolic shape in longitudinal cross section as shown in FIG. 4 or elliptical, polyellipsoidal or other conical shape known in the art. Wall 38 provides a reflective surface 39 for reflecting light generated by plasma 11 to open end 40 of housing 37, generally in the direction of arrow 41. In FIG. 4, insulator 42 (such as clear glass, quartz, or sapphire) is positioned in between reflective polarizer screen 43 and plasma 11. In the embodiment of FIG. 4, the film layer 43 and insulator layer 42 are positioned adjacent to one another, though layer 42 is preferably much thicker than layer 43 to form a sufficient insulating layer.

Figure 5:
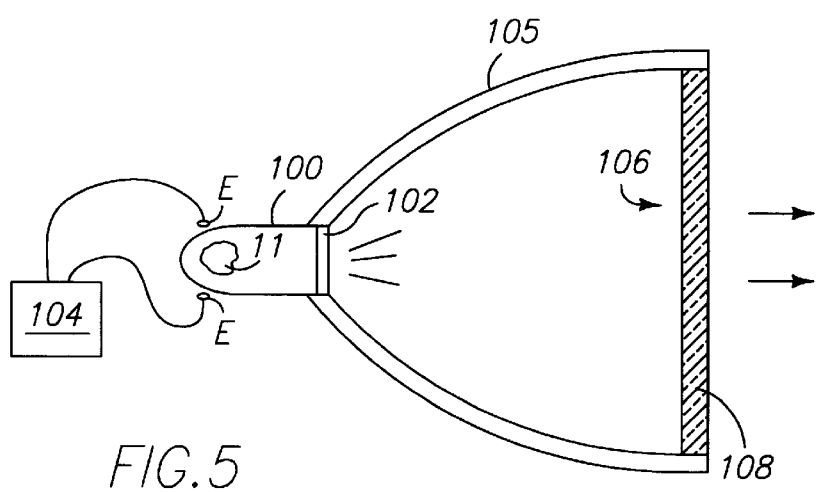
FIG. 5 is a system in which the lamp according to the invention would be implemented for providing light of desired characteristics.

Turning to FIG. 5, shown is a cutaway diagram of a lamp and reflector system implemented according to the invention. In this case, a lamp 100 is provided, similar to lamp 10A of FIG. 1. In this case, rather than DBEF filter 21, however, a reflecting color selective filter 102 is provided. In a system implemented according to the invention, light of a certain polarity and of certain color frequencies is generally desired. Therefore, rather than just reflecting polarizer 18, filter 102 reflects light not of unwanted polarities, but of unwanted frequencies. Such filters can also have fairly low melting points relative to the temperature of plasma 11. Therefore, the configurations of lamps 10A–D can similarly be implemented in conjunction with this reflective color filter, rather than solely a reflecting polarizer. Also shown in FIG. 5 is the radio frequency energy source 104 coupled to the electrodes E. Further, lamp 100 is situated within the opening of a parabolic reflective housing 105, which directs the light out of an end 106, covering which is a polarizing filter 108, also made of DBEF mounted on a plate. In this way, the emitted light from opening 106 is of both the correct frequencies and of correct polarity for use in a projection system.

Figures 6, 7:
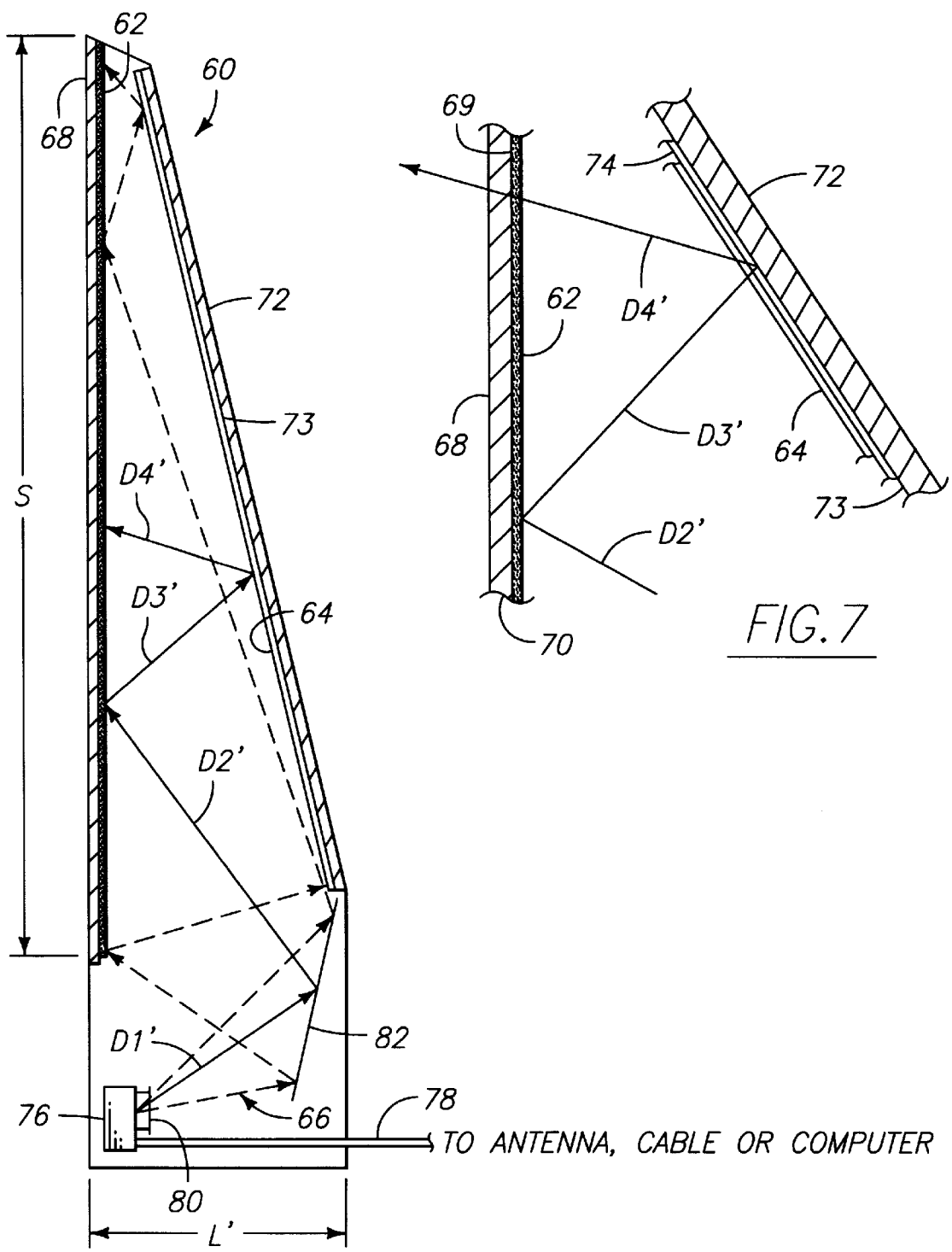
FIGS. 6 and 7 are side views of a system suitable for use of the apparatus according to the invention.

FIGS. 6 and 7 show a rear projection video system 60 that includes a linear reflecting polarizer 62 and an achromatic retarder 64 that allow light in a projected image 66 to reflect from a display screen 68 at one instance and to pass through the screen 68 at another instance. This allows for "optical folding," which allows the video system 60 to be very shallow yet project a large image, as described in the previously incorporated U.S. patent application entitled "Projecting Images." For the video system 60 to work properly, the image source 76 must produce polarized light. A wide variety of other types of video systems employ polarization in image formation.

The lamp according to the invention could be advantageously used in such a system in an image engine as described in prior co-pending U.S. patent application Ser. No. 08/730,818, entitled "Image Projection System Engine Assembly," to Knox, filed Oct. 17, 1996, hereby incorporated by reference.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A high efficiency lamp apparatus for producing a light beam of polarized light comprising:
    a lamp body that defines a chamber;
    a fill adapted to form a light source contained within the chamber;
    a reflector attached to the lamp body and adapted to redirect some light emitted by the light source back to the lamp apparatus so that light energy is reabsorbed to intensify the light source;
    wherein the reflector is adapted to reflect light with non-desired characteristics and to transmit light with desired characteristics; and
    an insulator adapted to prevent heat intensity of the light source from damaging the reflector.

2. The lamp apparatus of claim 1 further comprising:
    electrodes for exciting the fill to form a plasma, wherein the electrodes are not subjected to the intense heat generated at the plasma.

3. The lamp apparatus of claim 1 further comprising:
    electrodes for exciting the fill to form a plasma wherein the electrodes are positioned externally of the lamp chamber for producing radio frequency energy that excites the fill, forming a plasma light source of intense heat that emits a light beam.

4. The high efficiency lamp apparatus of claim 1, wherein the reflector comprises a film.

5. The high efficiency lamp apparatus of claim 4, wherein the film comprises double brightness enhancement film.

6. The high efficiency lamp apparatus of claim 1, wherein the insulator comprises a layer of material positioned in between the light source and the reflector.

7. The high efficiency lamp apparatus of claim 6, wherein the layer of material is a glass plate.

8. The high efficiency lamp apparatus of claim 6, wherein the layer of material is quartz.

9. The high efficiency lamp apparatus of claim 6, wherein the layer of material is sapphire.

10. The high efficiency lamp apparatus of claim 1, wherein the insulator comprises an infrared reflector.

11. The high efficiency lamp apparatus of claim 1, wherein the insulator comprises an enlarged gaseous space positioned in between the light source and the reflector.

12. The high efficiency lamp apparatus of claim 1, wherein the reflector is positioned at one end of the lamp body and the insulator is positioned within the lamp body in between the light source and the reflector, the light source comprising a plasma light source.

13. The high efficiency lamp apparatus of claim 1, wherein the insulator comprises an air gap positioned externally of the lamp body and the reflector comprises a film layer positioned opposite the air gap from the light source, the light source comprising a plasma light source.

14. The high efficiency lamp apparatus of claim 1, wherein the reflector is a polarizing reflector that transmits light of a first polarity and reflects light of a second polarity.

15. The high efficiency lamp apparatus of claim 1, wherein the reflector is a frequency selective reflector that reflects radiation of non-desired frequencies and transmits radiation of desired frequencies.

16. A system for providing light, comprising:
    an energy source providing a signal;
    a lamp, comprising:
        a lamp body that defines a chamber;
        a fill adapted to form a light source contained within the chamber;
        a reflector attached to the lamp body and adapted to redirect some light emitted by the light source back to the lamp apparatus so that light energy is reabsorbed to intensify the light source;
        wherein the reflector is adapted to reflect light with non-desired characteristics and to transmit light with desired characteristics; and
        an insulator adapted to prevent heat intensity of the light source from damaging the reflector.

17. The system of claim 16 farther comprising:
    a reflector housing situated adjacent said lamp for directing the light from said lamp.

18. The system of claim 16, further comprising:
a second reflector positioned in said reflector housing adapted to pass light with desired properties and to reflect light with non-desired properties back to the lamp.

19. The system of claim 18, wherein the reflector comprises a film layer.

20. The system of claim 19, wherein the film comprises double brightness enhancement film.

21. The system of claim 18, wherein the insulator comprises a layer of material positioned in between the light source and the reflector, the light source comprising a plasma light source.

22. The system of claim 21, wherein the layer of material is a glass plate.

23. The system of claim 21, wherein the layer of material is quartz.

24. The system of claim 21, wherein the layer of material is sapphire.

25. The system of claim 18, wherein the insulator comprises an infrared reflector.

26. The system of claim 18, wherein the insulator comprises an enlarged gaseous space positioned in between the light source and the reflector, the light source comprising a plasma light source.

27. The system of claim 18, wherein the reflector is positioned at one end of the lamp body and the insulator is positioned within the lamp body in between the light source and the reflector.

28. The system of claim 18, wherein the insulator comprises an air gap positioned externally of the lamp body and the reflector comprises a film layer positioned opposite the air gap from the light source, the light source comprising a plasma light source.

29. The system of claim 18, wherein the reflector comprises a polarizing reflector adapted to transmit light of a first polarity and to reflect light of a second polarity.

30. The system of claim 18, wherein the reflector comprises a frequency selective reflector adapted to reflect radiation of non-desired frequencies and to transmit radiation of desired frequencies.

31. The system of claim 16, further comprising:
electrodes adapted to excite the fill to form a plasma, wherein the electrodes are not subjected to intense heat generated at the plasma.

32. The system of claim 16, further comprising:
electrodes for exciting the fill to form a plasma wherein the electrodes are positioned externally of the lamp chamber for producing radio frequency energy that excites the fill, forming a plasma light source of intense heat that emits a light beam.

33. The high efficiency lamp apparatus of claim 1, wherein the light source comprises a plasma light source.

34. The high efficiency lamp apparatus of claim 1, wherein the insulator is adapted to retain the light source.

35. The high efficiency lamp apparatus of claim 1, wherein the insulator spans an opening of the chamber.

36. The system of claim 16, wherein the light source comprises a plasma light source.

37. The high efficiency lamp apparatus of claim 16, wherein the insulator is adapted to retain the light source.

38. The high efficiency lamp apparatus of claim 16, wherein the insulator spans an opening of the chamber.

* * * * *